United States Patent
Shrestha et al.

(10) Patent No.: US 10,546,197 B2
(45) Date of Patent: Jan. 28, 2020

(54) SYSTEMS AND METHODS FOR INTELLIGENT AND INTERPRETIVE ANALYSIS OF VIDEO IMAGE DATA USING MACHINE LEARNING

(71) Applicant: Ambient AI, Inc., Palo Alto, CA (US)

(72) Inventors: Shikhar Shrestha, Palo Alto, CA (US); Vikesh Khanna, Palo Alto, CA (US)

(73) Assignee: Ambient AI, Inc., Palo Alto, CA (US)

( * ) Notice: Subject to any disclaimer, the term of this patent is extended or adjusted under 35 U.S.C. 154(b) by 0 days.

(21) Appl. No.: 16/137,782

(22) Filed: Sep. 21, 2018

(65) Prior Publication Data

US 2019/0095716 A1 Mar. 28, 2019

Related U.S. Application Data

(60) Provisional application No. 62/563,510, filed on Sep. 26, 2017, provisional application No. 62/593,769, filed on Dec. 1, 2017.

(51) Int. Cl.
*G06K 9/00* (2006.01)
*G08B 13/196* (2006.01)
*G06N 20/00* (2019.01)

(52) U.S. Cl.
CPC ......... *G06K 9/00718* (2013.01); *G06N 20/00* (2019.01); *G08B 13/19613* (2013.01)

(58) Field of Classification Search
CPC ..... G06K 9/00718; G06K 2009/00738; G06K 9/00744; G06K 9/00771; G06K 9/00335;
(Continued)

(56) References Cited

U.S. PATENT DOCUMENTS 9,665,777 B2  5/2017 Naikal et al.
9,746,988 B2  8/2017 Kim et al.
(Continued)

OTHER PUBLICATIONS

Boufarguine, Mourand, et al., "Virtu4D: a Real-time Virtualization of Reality", 5th International Symposium 3D Data Processing, Visualization and Transmission, 2010.
(Continued)

*Primary Examiner* — Mehrdad Dastouri
*Assistant Examiner* — Kristin Dobbs
(74) *Attorney, Agent, or Firm* — Jeffrey Schox; Shant Tchakerian

(57) ABSTRACT

A system and method for implementing a machine learning-based system for generating event intelligence from video image data that: collects input of the live video image data; detects coarse features within the live video image data; constructs a coarse feature mapping comprising a mapping of the one or more coarse features; receives input of the coarse feature mapping at each of a plurality of distinct sub-models; identify objects within the live video image data based on the coarse feature mapping; identify one or more activities associated with the objects within the live video image data; identify one or more interactions between at least two of the objects within the live video image data based at least on the one or more activities; composes natural language descriptions based on the one or more activities associated with the objects and the one or more interactions between the objects; and constructs an intelligence augmented live video image data.

20 Claims, 6 Drawing Sheets

(58) Field of Classification Search
CPC .... G06N 20/00; G08B 13/19613; G06T 7/20; H04L 29/06891
USPC .................................. 348/143; 382/155, 156
See application file for complete search history.

(56) References Cited

U.S. PATENT DOCUMENTS

| | | | |
|---|---|---|---|
| 9,883,165 | B2 | 1/2018 | Denizot et al. |
| 2004/0119819 | A1 | 6/2004 | Aggarwal et al. |
| 2006/0268108 | A1 | 11/2006 | Abraham |
| 2006/0279630 | A1 | 12/2006 | Aggarwal et al. |
| 2011/0164163 | A1* | 7/2011 | Bilbrey ................. G06F 1/1694 348/333.01 |
| 2011/0249867 | A1* | 10/2011 | Haas .................. G06K 9/00818 382/103 |
| 2013/0128050 | A1 | 5/2013 | Aghdasi et al. |
| 2014/0347475 | A1 | 11/2014 | Divakaran et al. |
| 2015/0235379 | A1* | 8/2015 | O'Gorman ......... G06K 9/00718 382/103 |
| 2016/0378861 | A1 | 12/2016 | Eledath et al. |
| 2017/0054982 | A1* | 2/2017 | Vellore Arumugam ..................... H04N 19/132 |
| 2017/0308753 | A1* | 10/2017 | Wu ........................... G06T 7/62 |

OTHER PUBLICATIONS

Guennoun, Mouhcine, et al., "Augmented Reality-Based Audio/Visual Surveillance System", 2008 IEEE International Workshop on Haptic Audio Visual Environments and Games, IEEE, 2008.

Sebe, Ismail Oner, et al., "3D Video Surveillance with Augmented Virtual Environments", First ACM SIGMM International Workshop on Video Surveillance. ACM, 2003.

\* cited by examiner

200

Capturing Image Data S210

Accessing the Image Data S220

Extracting High-Level Features S230

Generating Sub-Model Feature Outputs S240

Condensing Feature Outputs S250

Generating Scene Description S260

FIGURE 2

SYSTEMS AND METHODS FOR INTELLIGENT AND INTERPRETIVE ANALYSIS OF VIDEO IMAGE DATA USING MACHINE LEARNING

CROSS-REFERENCE TO RELATED APPLICATIONS

This application claims the benefit of U.S. Provisional Application No. 62/563,510, filed 26-Sep.-2017, and U.S. Provisional Application No. 62/593,769, filed 1-Dec.-2017, which are incorporated in their entireties by this reference.

TECHNICAL FIELD

This invention relates generally to the computer vision field, and more specifically to a new and useful artificially intelligent image data analysis system in the computer vision field.

BACKGROUND

Prevalent security and surveillance systems typically enable the monitoring and capture of video images of an area of interest to the entities implementing the systems. Over the course of some time period, such as a day, a week, or a month, such security and surveillance systems may capture significant amounts of video data, which is typically too great for any individual human, or multiple humans, to meaningfully review for the purposes of detecting events of interest including security events. Often such review is merely reactive to a security event or other event that has occurred in the past. While in some instances this type of review may be useful in resolving or addressing less time-sensitive security events or the like, this type of review is merely reactive and the time lost reviewing the video image data can adversely impact obtaining a desired result for time-sensitive security events by the entity implementing the security system.

However, even in real-time (or near real-time) monitoring and review of video images streaming from several surveillance video cameras of the security and surveillance systems can be extremely difficult for human detection of events of interest. Because in most circumstances, defined spaces that are under surveillance via the security and surveillance systems incorporate multiple video cameras and thus, providing multiple video feeds to a security control center or the like than there are security personnel to monitor and review the video feeds. Thus, in a real-time monitoring and surveilling situation, many events of interests, including security events, are missed and thus, compromising the security and/or safety of the defined space(s) and/or the subjects (e.g., persons, protected products, etc.) within the defined space.

Additionally, some modern video analysis techniques may implement computer vision technology that enables automatic detection of objects in video data by a machine rather than relying on a human. In these implementations, the video analysis technique may include a specific detector that may be implemented for identifying a category of object (e.g., instance level detection). within video data. In more advanced implementations, for a single computer vision task, such as object detection, pose estimation, or scene segmentation, a general model for the single computer vision task may be implemented for accomplishing the discrete computer vision tasks. While such implementations may function to enable automated detections within video data, the discrete detection and analysis method fails to provide comprehensible and actionable detections.

Thus, there is a need in the computer vision and security fields to create a new and useful image data analysis and event detection system for intelligently detecting events of interest and providing a comprehensive interpretation of the detected events. The embodiments of the present application provide such new and useful systems and methods.

SUMMARY OF THE INVENTION

In one embodiment, a machine learning-based system for generating event intelligence from video image data includes one or more video image data sources that capture live video image data of one or more scenes; a coarse feature extraction model that: collects input of the live video image data captured through the one or more video image data sources, the live video image data comprising a plurality of successive image frames of the one or more scenes; detects one or more coarse features within the live video image data by performing at least edge detection within the live video image data; extracts the one or more coarse features within the live video image data based on results of the edge detection; constructs a coarse feature mapping comprising a mapping of the one or more coarse features to each of the plurality of successive image frames of the live video image data; an ensemble of distinct machine learning models that: receives input of the coarse feature mapping at each of a plurality of distinct sub-models that define the ensemble of distinct machine learning models; identifies objects within the live video image data based on the coarse feature mapping; identifies one or more activities associated with the objects within the live video image data based on the coarse feature mapping; identifies one or more interactions between at least two of the objects within the live video image data based at least on the one or more activities; a condenser implementing a trained natural language model that: composes natural language descriptions based on the one or more activities associated with the objects and the one or more interactions between the objects; constructs an intelligence augmented live video image data by superimposing the natural language descriptions onto the live video image data; and displays via a user interface system the intelligence augmented live video image data.

In one embodiment, the plurality of distinct sub-models of the ensemble of distinct machine learning models include: a scene-level activity recognition model, a scene classification model, a semantic scene segmentation model, a general object detection mode, a human activity model, a human-centric model that estimates one or more a body pose, face detection, and human attribute recognition, and a human-object interaction model.

In one embodiment, if a human is recognized by the ensemble of distinct machine learning models, a first subset of the plurality of distinct sub-models of the ensemble is activated, and the first subset comprises the human activity model, the human-centric model, and the human-object interaction model.

In one embodiment, if a human is not recognized by the ensemble of distinct machine learning models, a first subset of the plurality of distinct sub-models of the ensemble is deactivated or maintained in an inactive state, and the first subset comprises one or more of the human activity model, the human-centric model, and the human-object interaction model.

In one embodiment, receiving input of the feature mapping at each of the plurality of distinct sub-models includes:

receiving the plurality of image frames associated with the feature mapping at two or more subsets of the plurality of distinct sub-models at variable image frame rates.

In one embodiment, receiving input of the feature mapping at each of the plurality of distinct sub-models includes: receiving the plurality of image frames associated with the feature mapping at a first subset of the plurality of distinct sub-models at a first predetermined image frame rate, receiving the plurality of image frames associated with the feature mapping at a second subset of the plurality of distinct sub-models at a second predetermined image frame rate, and the first subset is distinct from the second subset.

In one embodiment, the system includes a mutual feature data exploration engine that: collects feature output data generated by each of the plurality of distinct sub-models of the ensemble, wherein the feature output data includes extracted features from the video image data output from each of the plurality of distinct sub-models; identifies and extracts mutuality data and/or relationship data between one or more pairs of extracted features, wherein each of the one or more pairs comprises a first distinct extracted feature from one of the plurality of distinct sub-models and a second distinct extracted feature from another of the plurality of distinct sub-models; and generates one or more mutuality vectors or one or more relationship vectors based on the extracted mutuality data and/or relationship data between each of the one or more pairs of extracted features.

In one embodiment, the condenser implementing the trained natural language model further: receives an input of the one or more mutuality vectors or the one or more relationship vectors generated by the mutual feature data exploration engine; and composes the natural language descriptions based on the input of the one or more mutuality vectors or the one or more relationship vectors.

In one embodiment, the mutual feature data exploration engine identifies and extracts mutuality data and/or relationship data between one or more pairs of extracted features by: constructing a plurality of vector pairwise between extracted features of at least two distinct sub-models of the plurality of distinct sub-models; identifying overlapping segments or intersecting segments between the extracted features of each of the plurality of vector pairwise; and if an overlapping segment or an intersecting segment is identified between the extracted features of one or more of the plurality of vector pairwise, responsively generating the one or more mutuality vectors or the one or more relationship vectors.

In one embodiment, the mutual feature data exploration engine identifies and extracts mutuality data and/or relationship data between one or more pairs of extracted features by: constructing a plurality of vector pairwise between extracted features of at least two distinct sub-models of the plurality of distinct sub-models that are in pixel proximity within the video image data; and if pixels of a first distinct extracted feature is within a predetermined distance threshold of pixels of a second distinct extracted feature of one or more of the plurality of vector pairwise, responsively generating the one or more mutuality vectors or the one or more relationship vectors.

In one embodiment, the machine learning-based system: stores and indexes in a searchable video image database image metadata associated with the video image data produced by each of the coarse feature extraction model and the ensemble of distinct machine learning models.

In one embodiment, the machine learning-based system: receives a search query at the searchable video image database; and returns one or more of historical video image data and live video image data from the one or more video image data sources based on the search query.

In one embodiment, the machine learning-based system: generates video image data-based intelligence based on outputs of one or more of the plurality of distinct sub-models of the ensemble and the mutual feature data exploration engine; and generates a security alert to one or more user interface systems based on the video image data-based intelligence.

In one embodiment, the one or more video image data sources comprise one or more video cameras, and the live video image data comprises video image data.

In one embodiment, one or more components and/or processes of the machine learning-based system are implemented via an on-premise device distinct from the one or more video image data sources, the on-premise device being located near or proximate to the one or more video image data sources, and one or more other components and/or processes of the machine learning-based are implemented via a remote distributed computing network.

In one embodiment, a method for implementing a machine learning-based system for generating event intelligence from video image data includes implementing a coarse feature extraction model that: collects input of the live video image data captured through one or more video image data sources, the live video image data comprising a plurality of successive image frames of the one or more scenes; detects one or more coarse features within the live video image data by performing at least edge detection within the live video image data; extracts the one or more coarse features within the live video image data based on results of the edge detection; constructs a coarse feature mapping comprising a mapping of the one or more coarse features to each of the plurality of successive image frames of the live video image data; implementing an ensemble of distinct machine learning models that: receive input of the coarse feature mapping at each of a plurality of distinct sub-models that define the ensemble of distinct machine learning models; identify objects within the live video image data based on the coarse feature mapping; identify one or more activities associated with the objects within the live video image data based on the coarse feature mapping; identify one or more interactions between at least two of the objects within the live video image data based at least on the one or more activities; implementing a condenser associated with a trained natural language model that: composes natural language descriptions based on the one or more activities associated with the objects and the one or more interactions between the objects; constructs an intelligence augmented live video image data by superimposing the natural language descriptions onto the live video image data; and displays via a user interface system the intelligence augmented live video image data.

In one embodiment, the method includes implementing a mutual feature data exploration engine that: collects feature output data generated by each of the plurality of distinct sub-models of the ensemble, wherein the feature output data includes extracted features from the video image data output from each of the plurality of distinct sub-models; identifies and extracts mutuality data and/or relationship data between one or more pairs of extracted features, wherein each of the one or more pairs comprises a first distinct extracted feature from one of the plurality of distinct sub-models and a second distinct extracted feature from another of the plurality of distinct sub-models; and generates one or more mutuality vectors or one or more relationship vectors based on the extracted mutuality data and/or relationship data between each of the one or more pairs of extracted features.

In one embodiment, the condenser further includes: receiving an input of the one or more mutuality vectors or the one or more relationship vectors generated by the mutual feature data exploration engine; and composing the natural language descriptions based on the input of the one or more mutuality vectors or the one or more relationship vectors.

BRIEF DESCRIPTION OF THE FIGURES

FIG. 2 illustrates a method for image data analysis and event detection in accordance with one or more embodiments of the present application;

DESCRIPTION OF THE PREFERRED EMBODIMENTS

Figure 1:
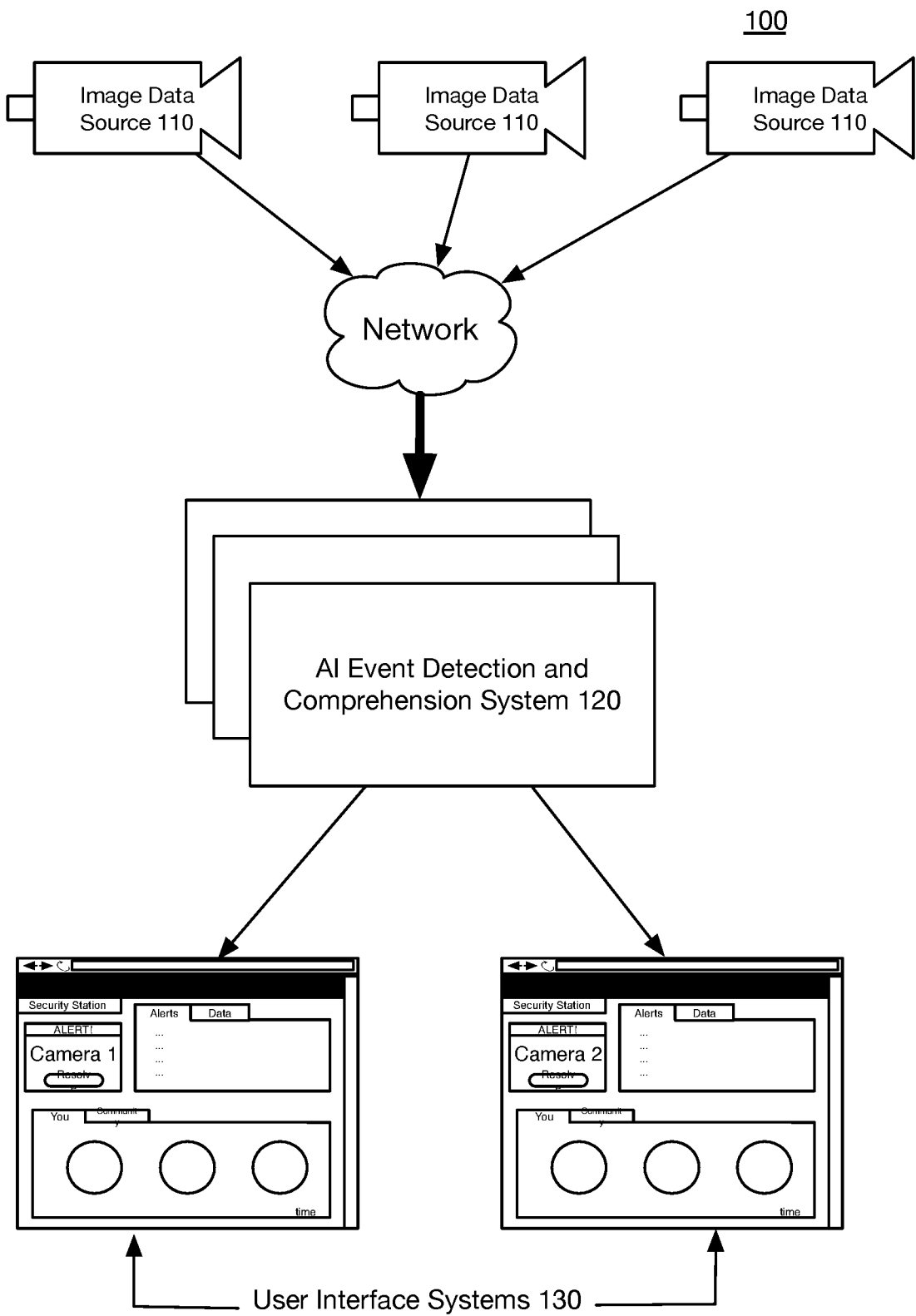
FIG. 1 illustrates a schematic of a system 100 for image data analysis and event detection in accordance with one or more embodiments of the present application.

The following description of preferred embodiments of the present application are not intended to limit the inventions to these preferred embodiments, but rather to enable any person skilled in the art of to make and use these inventions.

Overview

As discussed in the Background section of the present application, existing video analysis and surveillance systems fail to provide actionable intelligence and detections from video to enable real-time or near real-time responses to events of interest and/or time-sensitive events.

The embodiments of the present application, however, address these technical deficiencies of the existing technologies. Specifically, one or more embodiments of the present application provide a combined machine learning model core that functions to comprehend a scene, viewed from the perspective of a video camera or the like, in a holistic manner rather than examining a scene according to discrete analysis tasks at a time. The combined machine learning model core may, in some embodiments, implements a plurality of video analysis models capable of performing distinct computer vision tasks and feature detection.

Using the combined machine learning model, the one or more embodiments of the present application may function to process many aspects of video input, in parallel or synchronously, to achieve comprehensive detection results in real-time and provide actionable intelligence for increased environment security and/or safety, rapid (real-time) emergency response and/or incident response, rapid threat response, and the like. In this way, the feature outputs of the combined machine learning model core may be composited in such a manner to extract mutual information (e.g., where information of feature outputs overlap) existing between distinct feature outputs from each of the distinct video analysis models within the combined model core.

As an example of mutual information, when the system 100 (described below) performs scene segmentation analysis of video image data of a scene, if one or more of the scene segmentation models identifies or classifies part of the video image data as including a sidewalk in a part of the scene, it is more likely that the objects in this region are people instead of cars (more likely to be on the road). The mutual feature data exploitation engine 124 is capable of deriving these mutuality probabilities based on classification data from any of the models of system 100. Accordingly, based on a classification and identification of the one or more elements in a scene by the one or more models of system 100, the system 100 may automatically derive mutual relationship probabilities indicating a likelihood of a mutuality or relationship between the classified object or identified scene feature/element and one or more other potential objects or features in that may appear in the scene. During training, features that capture this mutual information can lead to better performance on every task. That is, the computed mutual information may function to enable improved classification of image features and/or detection of features within image data by various other models implemented by the system 100 because the mutual information may function to heighten a sensitivity of the one or more other models of the system 100 to the potential or probable mutual relationships identified within the mutual information. For instance, if a sidewalk is detected within a scene, the mutual feature data exploration engine 124 may function to generate mutual information indicating a probability of the existence of pedestrians or related sidewalk objects. As a result of receiving this mutual information as input into the multi-feature detection ensemble 122, a human detection model may be automatically initiated and biased or focused on detecting a potential pedestrian or human on the sidewalk. Thus, mutual information may enable a focused processing of segments of a scene and may enable the system 100 to increase a processing for models having a higher probability of detecting and/or classifying features within video image data.

The embodiments of the present application may leverage the identified mutual information (as input data) to derive relationship vectors that may be used by a trained language model in generating comprehensive and coherent interpretations of a scene. The generated interpretations may function to enable real-time actionable intelligence with respect to events of interest.

Figure 3:
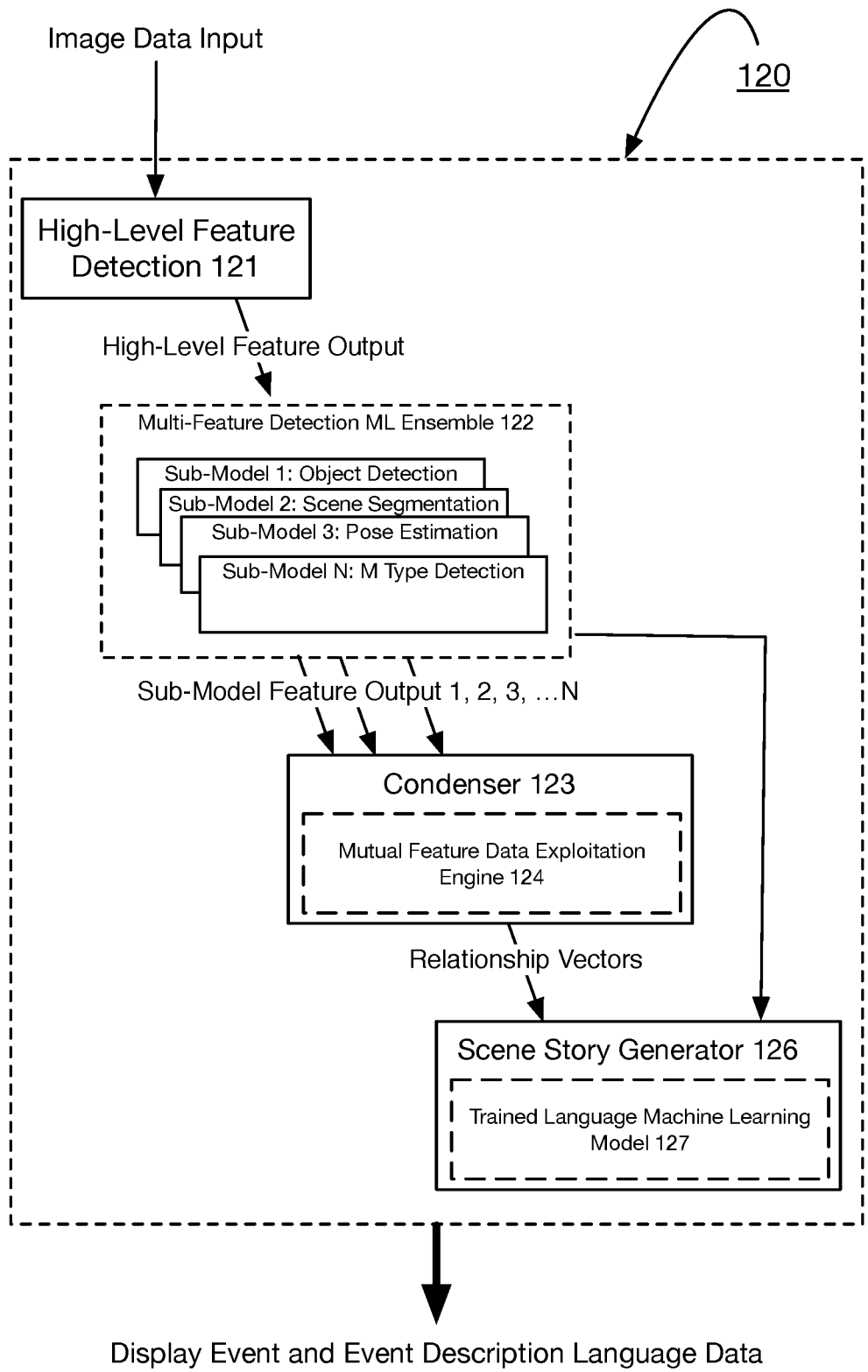
FIG. 3 illustrates a detailed schematic of an artificially intelligent event detection and comprehension system in accordance with one or more embodiments of the present application.

1. System for Artificially Intelligent Image Data Analysis and Feature Detection As shown in FIG. 1, a system 100 for artificially intelligent image data analysis and event detection includes one or more image data sources 110, an artificially intelligent event detection and comprehension system 120, and a user interface system 130. As shown in FIG. 3, the artificially intelligent event detection and comprehension system 120 may include a high-level feature detection model 121 multi-feature detection machine learning ensemble 122, a condenser 123 having a mutual feature data exploitation engine 124, and scene story generator 126 having a trained language machine learning model 127.

The system 100 functions to collect image data (in any form) from the one or more image data sources 110 within the system 100. The system 100 preferably functions to implement a combined machine learning model core (i.e., multi-feature detection machine learning ensemble 122) to detect relevant features within a scene defined by the collected image data. The system 100 may use the condenser 123 to form a composite of a plurality of feature outputs (e.g., f_1, f_2, f_3 . . . f_n) of the multiple sub-models of the combined model core. From the composite, the system 100, using the mutual feature data exploitation engine 124, functions to extract mutual/relationship data from overlapping segments of the composite and derives mutual/relationship vectors, as output. The system 100 may pass the plurality of feature data outputs and the mutual/relationship vectors to the story generator 126 that functions to use the trained machine learning model 127 to generate one or more event descriptions for the image data.

Preferably, the image data processed through the system 100 includes live image data relating to events and/or circumstances captured in real-time and/or near real-time (e.g., within 0-5 minutes or the like) by one or more image capturing devices, such as live-feed video cameras. Correspondingly, the system 100 may function to digest the live image data in real-time or near real-time to generate timely event or circumstance intelligence.

The one or more image data sources 100 preferably function to capture image data of one or more areas of interest. Additionally, or alternatively, while the system 100 may generally function to collect image data, the system 100 may additional function to capture any type or kind of observable data of an area or scene of interest including, but not limited to, thermal or heat data, acoustical data, motion and/or vibration data, object depth data, and/or any suitable data that can be sensed. The area of interest may be a fixed area in which a field of vision of an image capturing system may be fixed. Additionally, or alternatively, the area of interest may be dynamic such that a field of vision of an image capturing system may change continuously or periodically to capture different areas of interest. Thus, an area of interest may be dependent on a position and corresponding field of image data capture of an image data source or image capturing system. The image data sources 100 preferably include an image capturing system comprising one or more image capturing devices. The image capturing devices may include video cameras, still image cameras, satellites, scanners, frame grabbers, and the like that may be capable of capturing in real-time analog video signals, digital video signals, analog still image signals, digital still image signals, and the like. Additionally, digital images may be captured or produced by other sensors (in addition to light-sensitive cameras) including, but not limited to, range sensors, tomography devices, radar, ultra-sonic cameras, and the like.

The one or more image data sources 100 may function to capture image data and transmit the image data via a communication network (e.g., the Internet, LAN, WAN, GAN, short-range communication systems, Bluetooth, etc.) to the system 100. Additionally, or alternatively, the system 100 may function to access or pull the captured data from the one or more image data sources 110. In some embodiments, the one or more image data sources 110 may be in direct or operable communication with the artificially intelligent event detection and comprehension system 120, such that live image data captured at the one or more image sources 110 are fed directly into the one or more machine learning classifiers and feature detection models of system 120. Thus, in such embodiments, the live image data may not be stored (in a permanent or semi-permanent storage device) in advance of transmitting the live image data to the one or more processing modules and/or sub-systems of the system 100. A technical advantage achieved of such implementation include real-time or near real-time processing of an event or circumstance rather than post event processing, which may delay a suitable and timely response to an urgent occurrence.

In some embodiments, one or more parts or sub-systems (e.g., artificially intelligent event detection and comprehension system 120) of system 100 may be implemented via an on-premise system or device and possibly, in combination with a cloud computing component of the system 100. In such embodiments, the one or more image data sources 110 may function to both capture live image data in real-time and feed the live image data to the on-premise system for generating intelligence data from the live image data. In such embodiments, the on-premise system may include one or more hardware computing servers executing one or more software modules for implementing the one or more sub-systems, processes, and methods of the system 100.

Additionally, or alternatively, the one or more image capturing devices 110 may be configured to optimize scene coverage thereby minimizing blind spots in an observed area or area of interest and additionally, optimize overlapping coverage areas for potential areas of significant interest (e.g., a highly secure area, etc.). In some embodiments, the system 100 may function to process together overlapping image data from multiple image data sources 110 recording image data of a substantially same area (e.g., overlapping coverage areas) of interest. The image data in these areas of interest having overlapping coverage may enable the system 100 to generate increased quality event description data for a scene because of the multiple vantage points within the overlapping image data that may function to enable an increased or improved analysis of an event or circumstance using the additional detail and/or variances in data collected from the multiple image data sources.

Additionally, or alternatively, the system 100 may function to access additional event data sources including sensor data sources, news feed data sources, communication data sources, mobile communication device data (from users operating in an area of interest, etc.) and the like. The additional event data may be ingested by system 100 and used to augment the event description data for a scene.

Figure 3A:
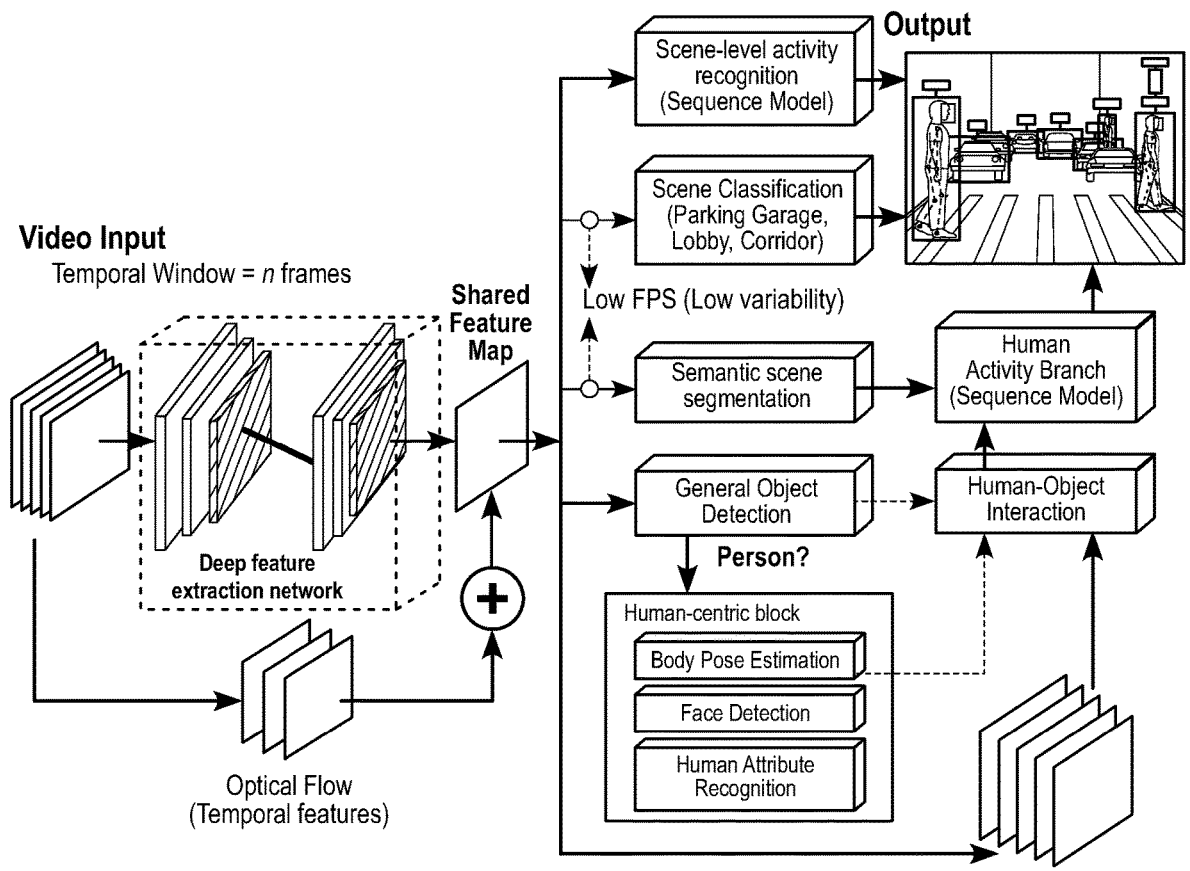
FIG. 3A illustrates a detailed schematic of a system for image data and comprehension in accordance with one or more embodiments of the present application.

The artificially intelligent event detection and comprehension system 120 functions to analyze and/or process image data input preferably originating from the one or more image data sources 110, as shown by way of example in FIGS. 3-3A. The artificially intelligent event detection and comprehension system 120 preferably includes a high-level deep learning model (e.g., a convolutional neural network, etc.) 121 that functions to perform feature extraction, including edge/border detection and other more abstract features with higher semantic information. Accordingly, the high-level deep learning model may function to identify and extract coarse semantic information from the image data input from the one or more image data sources 110. For instance, the high-level deep learning model implementing an artificial neural network may function to first extract broad scene level data and may generate descriptive metadata tags, such as outdoor, street, traffic, raining, and the like for each of the distinctly identified features.

The multi-feature detection machine learning ensemble 122 may include a plurality of sub-machine learning models, each functioning to perform a distinct feature detection and/or classification of features within image data. Specifically, the plurality of sub-machine learning models may function to perform distinct computer vision tasks and feature detection tasks that include, but are not limited to, pose estimation, object detection, facial recognition, scene segmentation, object attribute detection, activity recognition, identification of an object (e.g., person ID, vehicle, ID, fingerprint ID, etc.), motion analysis (e.g., tracking, optical flow, etc.), and the like. Each of the sub-models, accordingly, may use the features extracted by the core deep learning model and transform the feature into another vector in an n-dimensional hyperspace for a particular computer vision task or alternatively, extract image level features directly from image data and perform a same vector transformation (e.g., feature output data, as discussed further below). Additionally, the artificially intelligent event detection and comprehension system 120 may function to identify or classify any features of the accessed image data.

In one or more embodiments of the present application, a subset and/or all of the sub-models of the multi-feature detection machine learning ensemble 122 may be operated in parallel. In such embodiments, the image data from the one or more image data sources 100 may be sourced to each of the sub-models at the same or substantially the same time (e.g., within 0-5 seconds, etc.), such that a contemporaneous evaluation, classification, and/or feature detection may be performed simultaneously in each of the sub-models.

The artificially intelligent event detection and comprehension system 120 may be implemented by one or more computing servers having one or more computer processors (e.g., graphics process units (GPU), tensor processing unit (TPU), central processing units (CPUs, MCUs, etc.), or a combination of web servers and private servers) that may function to implement one or more ensembles of machine learning models. The ensemble of machine learning models may include multiple machine learning models that work together to exploit mutual information to provide accurate and useful feature detection and relationship vectors therefor. The artificially intelligent event detection and comprehension system 120 may function to communicate via one or more wired or wireless communication networks. The artificially intelligent event detection and comprehension system 120 may additionally utilize input from various other data sources (e.g., outputs of system 100, system 100 derived knowledge data, external entity-maintained data, etc.) to continuously improve or accurately tune weightings associated with features of the one or more of the machine learning models of the artificially intelligent event detection and comprehension system 100.

The artificially intelligent event detection and comprehension system 120 may employ any suitable machine learning including one or more of: supervised learning (e.g., using logistic regression, back propagation neural networks, random forests, decision trees, etc.), unsupervised learning (e.g., using an Apriori algorithm, k-means clustering, etc.), semi-supervised learning, reinforcement learning (e.g., using a Q-learning algorithm, temporal difference learning, etc.), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4-5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminant analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolutional network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in generating scene comprehension data via system 100.

The user interface system 130 may function to receive outputs from the artificially intelligent event detection and comprehension system 120 as well as from the one or more image data sources 110. The user interface system 130 may function to present image data from the one or more image data sources 110 together with a scene description or scene story of the image data. In one or more embodiments, a scene description may be presented by the user interface system 130 only when an event of interest (e.g., a predetermined event type, etc.) is detected within a scene. Accordingly, based on the detection of the event or circumstance, the system 100 may function to generate a scene description and/or scene story to detail the event or circumstance. Preferably, the image data comprises video data and the scene description or scene story may be superimposed over or augmented to the video data via a display of the user interface system 130, such that the scene description is presented at a same time as a video basis of the scene description. Additionally, or alternatively, the scene description or scene story may be presented in any suitable manner including visually, audibly, haptically, and the like.

Figure 5:
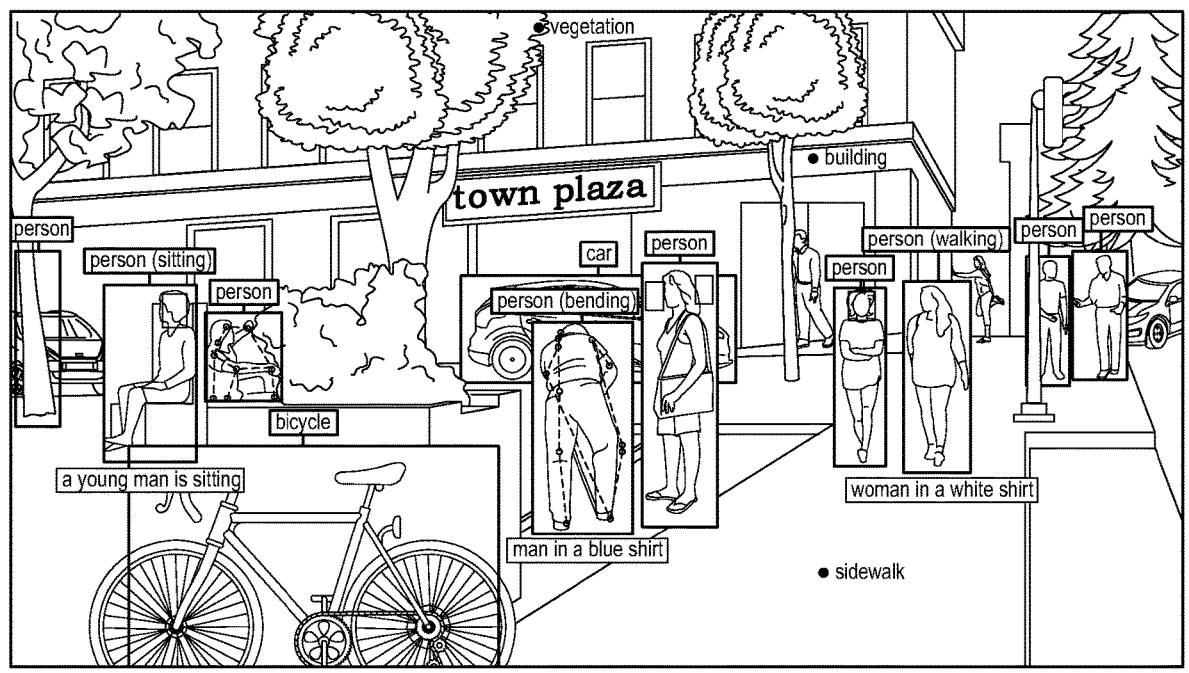
FIG. 5 illustrates a schematic of a scene computed through a system 100 in accordance with one or more embodiments of the present application.

By way of example, FIG. 5 illustrates an exemplary schematic of an output of the system 100 that may be provided via the user interface system 100. In particular, the system 100 may generally function to identify and display one or more labels for each of the objects detected within a scene (a live scene). In some embodiments, as the labeled objects move within the scene, the system 100 may function to track the labelled objects and correspondingly, track the positioning of a label to an object to a positioned of the object associated with the label that is being tracked. Additionally, as shown in FIG. 5, the system 100 may function to augment the image data with descriptive data that identifies a circumstance, event, activity, and/or situation detected within a scene. For instance, as shown in FIG. 5, the system may function to explicitly call out or mark a person sitting in the left of the scene and further, label the person sitting with a higher level detail of the person and the associated activity (i.e., "a young man is sitting") being performed by the person in the scene. Similar labels and activity descriptions may be performed for any static or dynamic object and any human or non-human object identified in the scene.

The user interface system 130 may include one or more computers having input/output systems including one or more of displays (e.g., video monitors), keyboards, mice, speakers, microphones, and the like. The user interface system 130 may additionally include a communication interface that enables the user interface system 130 to communicate over a communication network (e.g., the Internet) with the other components of system 100.

2. Method for Artificially Intelligent Image Data Analysis and Feature Detection As shown in FIG. 2, a method 200 for artificially intelligent image data analysis and event detection includes capturing image data S210, accessing the image data from one or more data sources S220, performing image analysis and extracting high level features of the image data S230, identifying features of the image data using a plurality of sub-machine learning models (sub-models) S240, condensing feature output data of each of the plurality of sub-models S250, and generating a natural (or formal) language description of a scene S260.

The method 200 functions to enable the ingestion of raw image data from one or more image data sources to generate scene comprehension output. Preferably, the method 200 implements a deep learning model that comprises an ensemble of disparate machine learning models for accomplishing a plurality of computer vision tasks and the like. As an initial step, the method 200 may identify and/or extract high-level features (e.g., edges and/or borders of elements within the image data) of the raw image data that the method 200 may pass to a subset of the ensemble of machine learning models for feature detection, feature classification, and processing. The method 200 may condense the (feature) outputs of each of the machine learning models and/or generate a compilation or composite of the outputs of each of the machine learnings models. The method 200 may function to provide, as input, the condensed or compiled output of the machine learning model to a language model that functions to interpret the composition of the extracted features within the one or more scenes of the image data by providing one or more natural language descriptions of the detected objects and/or activities within the one or more scenes.

S210, which includes capturing image data, functions to implement one or more image capturing devices, as image data sources, to capture image data of one or more scenes of interest. In a preferred embodiment, the one or more image capturing devices include one or more video cameras (preferably depth sensing cameras) that function to capture video images of one or more scenes. In a first implementation, the one or more image capturing devices may function to capture image data on a continuous basis (e.g., a first mode). Alternatively, the one or more image may function to capture image data on a periodic basis (e.g., a second mode) or based on a triggering event. The triggering event may be any preprogrammed or predetermined event that is of interest. Additionally, or alternatively, the triggering may be dynamic and/or a machine learned event. In one example, in one implementation, the method 200 may implement a microwave or a motion detector in combination with the one or more image capturing devices. In such instance, when or if the motion detector detects motion in a scene, the motion detector may transmit a motion signal to the image capturing device that causes or triggers the image capturing device to begin image capturing, preferably at a location at which the motion was detected.

The one or more image capturing devices may, additionally or alternatively, be configured in any suitable manner to capture image data from the one or more scenes or areas of interest. In one implementation, the one or more image capturing devices comprise a plurality of video cameras in which each video camera is configured to capture a fixed scene that is distinct from other video cameras. In a second implementation, the one or more image capturing devices comprise a plurality of video cameras capable of panning (or moving) in three dimensions (in the X, Y, Z-axes, for example) to capture image data from scenes in more than one area of interest. In a third implementation, the one or more image capturing devices comprise a plurality of video cameras in which pairs of or two or more cameras are configured (or positioned) to capture image data of an area of interest (e.g., an overlapping area of interest) from different positions or angles. In this third implementation, the pairs or multiple video cameras may function to capture image data in an overlapping area.

Additionally, or alternatively, S210 may include transmitting the captured image data. Specifically, S210 functions to transmit the captured image data to one or more local and/or remote destinations. In one implementation, S210 may transmit the captured image data to an artificially intelligent event detection and event comprehension platform for additional processing of the captured image data. In such implementation, if the artificially intelligent platform is implemented via a remote server and/or a distributed computing network (e.g., the cloud), S210 may transmit the captured image data via the Internet or the Web to the artificially intelligent platform. This may enable real-time event detection and comprehension of the scenes identified within the captured image data.

In another implementation, S210 may function to transmit the image data from the one or more image capturing devices to an on-premise system that may function to implement one or more steps of the method 200 including one or more of S220-S260. In a preferred embodiment, the on-premise system may operate in combination with the artificially intelligent event detection and event comprehension platform (operating on a remote distributed computing system) to perform any combination of the steps of the method 200.

Additionally, or alternatively, S210 may function to store the captured image data locally and/or at a remote storage.

S220, which includes accessing image data from the one or more image data sources, functions to receive or collect the image data to be used as image data input. In a preferred embodiment, a system implementing S220 (e.g., artificially intelligent system 120) may be in direct and operable communication with each of the one or more image data sources, such that upon capture of image data of the one or more scenes, the system may have immediate and real-time access to the image data for real-time processing.

In some embodiments, the image data from the one or more image data sources comprises a real-time or near real-time stream of image data. In such embodiments, the stream of image data may be video image data that may be useable as video input by the system implementing portions of the method 200. Additionally, or alternatively, S220 may function to access the image data indirectly from one or more storage mediums accessible to a system implementing the method 200.

S230, which includes performing image analysis and extracting high level features of the image data, functions to receive, as input, the image data of the one or more image data sources. In a preferred embodiment, the image data comprises video image data and is thus, video input. In such embodiment, the image data comprises a plurality of temporally consecutive image frames of the one or more scenes captured by the one or more image data sources. The image data is preferably received at a trained deep machine learning model for image data analysis and processing. The trained deep machine learning model may implement any suitable image analysis and feature extraction algorithms to detect features in the image data.

At the deep learning model, S230 preferably functions to analyze the image data on frame-by-frame basis such that each frame of the image data may be analyzed and processed separately (preferably in sequential order) by the deep learning model. The deep learning model may function to extract high level features (e.g., coarse features, etc.) from the image data including edge features (e.g., lines, borders, ridges, etc.) of potential elements and/or objects within the image data, patterns within the image data, a count of potential object or features within the image data and the like. Accordingly, S230 may function to detect sharp changes in image brightness within each of a plurality of frames of the image data to identify events and/or changes in properties within a scene. These discontinuities or changes in brightness in the image data identified in S230 may correspond to one or more of, but not limited to, discontinuities in depth, discontinuities in surface orientation, changes in material properties, and variations in scene illumination, etc. Resultantly, S230 using the deep learning model for edge detection and/or coarse feature detection may enable the formation of a set of connected curves within the image data that indicate boundaries of objects, boundaries of surface markings as well as correspond to discontinuities in surface orientation in the image data.

Additionally, or alternatively, S230 may function to use the deep learning model to convert the identified high level features into sets of numerical data or vectors identifying locations of each of the identified high level features within the image frames. Specifically, S230 may determine a set of numerical data for each of the detected high level features within the image data and associate that numerical data with a fragment of the image data thereby defining a descriptor or descriptor data for each high-level feature detected within the image data. It shall be noted that S230 may function to add or generate any suitable metadata to the image data for identifying the extracted features including augmenting image frames with curved (edge) lines and classification labels for identifying potential objects in the image data and the like. Preferably, the detected high level feature metadata may be identified or augmented to a shared feature map, as discussed in more detail below.

Contemporaneously or in parallel with performing a high level extraction of features from the image data, S230 may function to identify or estimate an optical flow of the image data and identify temporal features thereof. For instance, S230 may function to extract temporal motions features and motion dynamic sequences from the image data thereby identifying whether one or more elements within the image data appear to be moving or static between image frames.

Additionally, or alternatively, S230 may function to generate a shared feature map based on the extracted high level features and/or the temporal features derived from an estimated optical flow of the image data. The shared feature map preferably includes a composite of the extracted high level features and/or the temporal features of the image data. Accordingly, the shared feature map may function to associate the pixels in the image data with each of the identified high level features and/or identified temporal features. Thus, each image frame of the image data may be augmented with the composition of the extracted high level feature data and/or the temporal feature data. S230 may additionally function to provide the shared feature map as input to the plurality of sub-machine learning models for analysis and processing. At least one technical benefit of the shared feature map includes a reduction in a complexity of image data analysis at the ensemble of sub-models used in specific feature detection within the image data. In particular, the high level feature metadata (e.g., curved lines, pixel associations, etc.) enables pointed and/or directed feature classification and feature estimation analysis by each of the plurality of sub-models.

S240, which includes identifying additional features of the image data using a plurality of sub-machine learning models (sub-models), functions to receive the high-level feature data detected at the primary machine learning model and use the high-level feature data, as input, into a secondary machine learning model that functions to detect sub-features (e.g., specific features) associated with the detected high-level features. The primary machine learning model may function to store the detected high-level features of the image data at a storage device that may be accessible to the secondary machine learning model. Additionally, or alternatively, the primary machine learning model may function transmit, in real-time or near real-time, its output directly to the secondary machine learning model (i.e., sub-models).

Accordingly, in some embodiments, S240 may function to provide the image frames of the raw image data and image frames associated with the shared feature map to the plurality of sub-machine learning models. Preferably, to increase feature analysis within the image data, only the shared feature map may be passed along as input into the secondary machine learning model.

Additionally, or alternatively, S240 may function to provide the raw image data and/or the shared feature map data to each of the plurality of sub-models at variable image frame rates, as shown by way of example in FIG. 3A. For instance, S240 may function to provide a first subset of the plurality of sub-models the image data at a first predetermined frame rate (i.e., predetermined number of frames per second) and provide a second (non-overlapping or distinct) subset of the plurality of sub-models the image data at a second predetermined frame rate. In such example, the first predetermined frame rate may have a higher frame per second (fps) value than the second predetermined frame rate.

In one implementation, S240 may function to provide the image data and/or the like at a first predetermined number of frames to a first subset of the plurality of sub-models comprising a scene classifier and a semantic scene segmentation model and provide the image data and/or the like at a second predetermined number of frames to a second subset of the plurality of sub-models comprising a scene-level activity recognition model and a general object detection model. In such implementation, the first predetermined number of frames may be at a low number of frames per second (for low variability) and the second predetermined number of frames may be set at a high number of frames per second.

The secondary machine learning model implemented at S240 preferably comprises a plurality of distinct machine learning models that function to perform distinct computer vision and feature recognition tasks. These distinct machine learning model, in some embodiments, may be considered individual sub-models within an ensemble defined by the plurality of distinct machine learning models. In a preferred embodiment, the plurality of sub-machine models preferably include a combination of machine learning classifiers producing classification labels for one or more features of the image data and inferential machine learning models that function to estimate or predict one or more features (e.g., body pose estimation, object trajectory, and the like).

In one implementation, the ensemble of sub-machine learning models may be configured to process image data input in parallel or synchronously. That is, S230 may function to cause the primary machine learning model to pass the detected high-level feature data to each of the sub-models of the ensemble. Upon receipt, S240 may function to operate each of the plurality of sub-models, preferably in parallel, to process the received high-level feature data in a parallel fashion, such that each of the sub-models are processing the high-level feature data at a same time or substantially the same time.

In a second implementation, the type or kind of high-level features extracted at the primary machine learning model, during S230, may dictate or govern which of the plurality of sub-models functions to operate and process high-level feature data. That is, in some embodiments of S230, the primary machine learning model may also function to provide a prediction or estimation about the detected high-level features that functions to activate only a subset of the plurality of sub-models or that may be used by a system implementing the method 200 to dynamically and selectively indicate which of the plurality of sub-models that should receive and further process the high-level feature data (and image data) from the primary machine learning model. The estimation selectively identifying and/or causing an activation of one or more sub-models may be added as metadata to the identified high-level feature data (or the descriptor data). For instance, the primary machine learning model may estimate an attribute (e.g., a high-level feature) of image data as being square or substantially square thereby causing the secondary machine learning model to prevent an operation of a sub-model that is configured for detecting balls from processing the image data fragment that includes the square feature. The attribute data estimated by the primary machine learning may be augmented to or associated with descriptor data. In another example, the extracted high level features from the image data may indicate that borders and/or lines of a potential vehicle and of a potential human. In such example, metadata for activating human-based detection and activity models and meta for activating vehicle-based detection and activity models may be augmented to the high level feature data or in any suitable form, passed along with the high level feature data.

Accordingly, in this second implementation of S240, the secondary machine learning models may use the attribute data and/or a description data of the high-level features identified at the primary machine learning model to selectively indicate which of the sub-models of the plurality of sub-models that should be activated for processing the high-level feature data (image data) and identify which of the plurality of sub-models to remain dormant and/or deactivated.

As mentioned above, each of the plurality of sub-models of the secondary machine learning model may be specifically configured for classifying and/or detecting different features within the image data. For instance, the secondary machine learning model may include a pose estimation sub-model, a facial recognition sub-model, human attribute recognition model, a human activity (sequence) model, a human-object interaction model, a scene classification model, an object detection sub-model, a scene-level activity recognition (sequence) sub-model, a scene segmentation sub-model, object attribute identification sub-model, motion analysis sub-model, and the like. It shall be noted that any suitable pattern and/or feature detection sub-model for accurately detecting and identifying relevant objects and activities within a scene of the image data may be implemented as a sub-model.

S250, which includes condensing the feature outputs of each of the plurality of sub-models, functions to condense the feature outputs of each of the plurality of sub-models into a single feature outputs composite. The feature outputs for at least a subset of the one or more sub-models preferably includes feature vectors and associated classification labels for each of the feature vectors. The composite of the feature outputs of the plurality of sub-models may function to expose overlaps or proximities in the feature outputs. That is, in a composited form, S250 may function to identify overlapping or proximate feature data among the composited feature outputs. Accordingly, overlapping feature data and/or proximity feature data of the feature outputs composite may indicate mutual information and/or relationship data between two or more disparate feature outputs or two or more distinct elements within the image data.

For example, in scene images that have been processed at S240, a first feature output of an object detection sub-model may classify an object within the scene to be a person, a second feature output of the object detection sub-model may classify an object in the scene to be a road, and a third feature output of a scene segmentation sub-model may classify that an area around a person is a road. In such example, when the first, second, and third feature outputs are composited (e.g., at S250) together for analysis, a system implementing method 100 may function to predict (with reasonable probability or likelihood) that the person in the scene may be on the road based on the overlap or proximity of the feature output data (e.g., the classifications) of first and third feature output data (e.g., both the first and third feature output data identify/classify a road in the scene) and the overlap or proximity of the feature output data of the second and the third feature output data (e.g., both the second and third feature data identify/classify a person in the scene).

Figure 4:
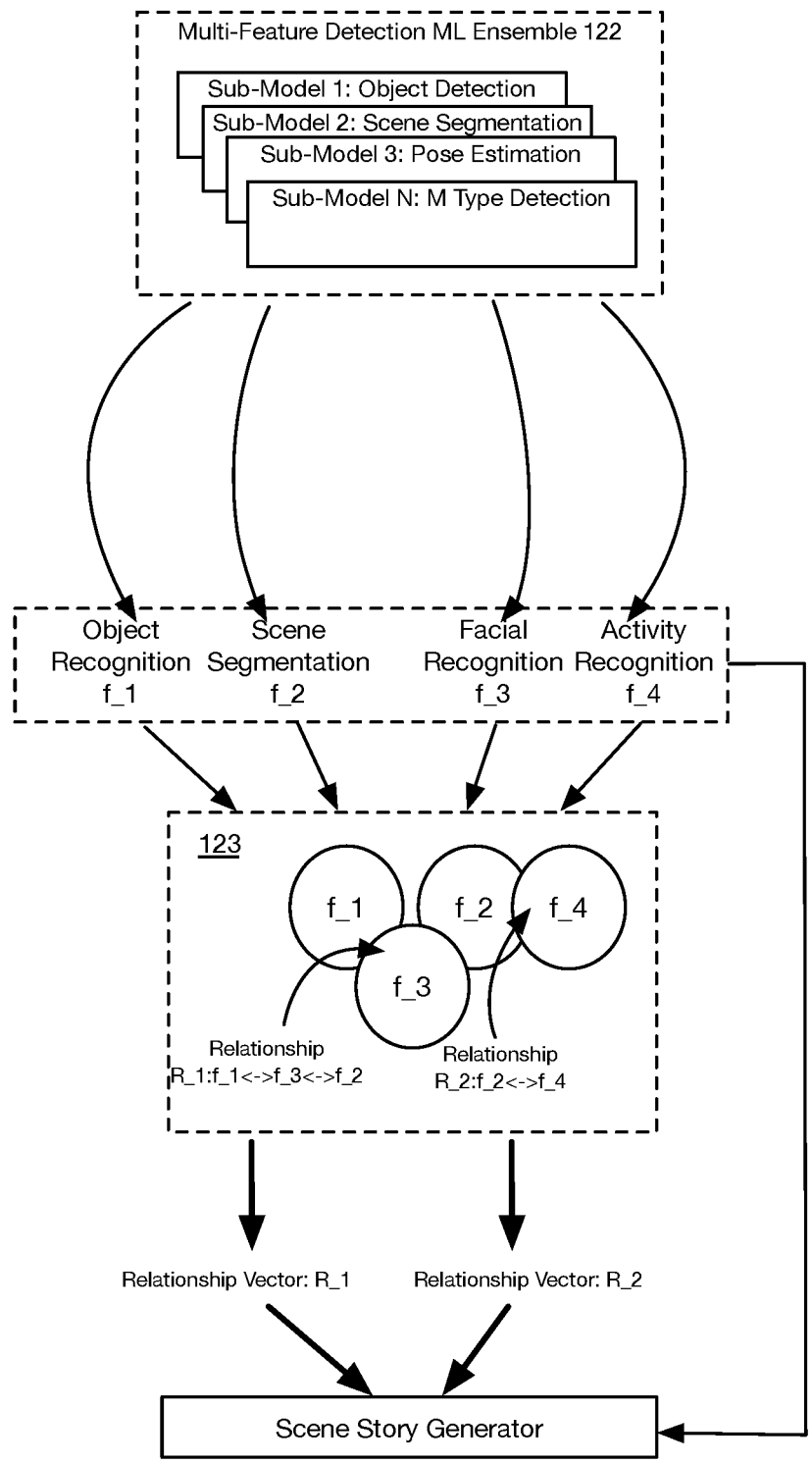
FIG. 4 illustrates a detailed schematic of components of the artificially intelligent event detection and comprehension system in accordance with one or more embodiments of the present application.

Thus, when the disparate feature output data is composited, S250 functions to identify shared feature data points between the disparate feature outputs to identify and extract shared data points or mutual data points, as shown in FIG. 4. S250, may additionally function to use the identified shared data points (mutual data) to estimate relationships between two or more features within a scene. In particular, S250 may function to provide the extracted mutual data, as input, into a trained relationship machine learning model that functions to derive knowledge of relationships existing between the disparate feature outputs. The derived relationship data may be used to bind together the disparate feature outputs having the mutual data. In this regard, S250 may function to link together the disparate feature outputs by augmenting metadata comprising the derived relationship data to each of the disparate feature outputs.

In a variation, S250 may function to identify and/or derive mutual data or relationship data between disparate features of image data based on feature vector proximity analysis or vector pairwise analysis. In such variation, two or more feature vectors having distinct classification labels or the like may be analyzed or otherwise, considered together for identifying whether mutual and/or relationship data may be derived or extracted therefrom. In such implementation, S250 may function to identify if the two or more feature vectors overlap, appear to intersect, or otherwise, form adjacent segments within the image data such that a potential relationship may be derived therefrom.

In one implementation, S250 may function to construct a plurality of vector pairwise between a plurality of distinct feature vectors of the image data. In such implementation, S250 may function to construct vector pairwise between all distinct feature vectors within image data and evaluate each pairing to determine or identify mutual and/or relationship data. Preferably, S250 functions to source the distinct features vectors from output of each of the plurality of distinct sub-models. That is, S250 preferably functions to generate the plurality of vector pairwise by pairing at least two distinct feature vectors from at least two distinct sub-models (or machine learning models and/or recognition algorithms of a system implementing the method 200).

In another implementation, S250 may function to construct a plurality of vector pairwise between two or more distinct feature vectors of the image data within pixel proximity within the image data. That is, S250 may function to construct feature pairwise comparison between two or more distinct feature vectors based on how close the pixels of the two or more distinct feature vectors are from each other. For instance, a feature vector representing a ball may be in close pixel proximity of a person's hand. In such instance, S250 may function to construct a vector pairwise between the feature vectors of the person's hand and feature vectors of the ball to determine and/or identify potential mutual data and/or relationship data. Any suitable proximity value (e.g., a predetermined proximity, etc.) or proximity threshold value may be used to determine whether two or more distinct feature vectors are in sufficient proximity. For instance, S250 may identify mutuality and/or relationship between two distinct features (e.g., objects, etc.) of image data based on a proximity of the two distinct features being equal to or less than a proximity threshold. Accordingly, even if the two distinct features do not overlap or otherwise, have adjacent pixels, S250 may function to identify mutual data and/or relationship data based on the number of pixels between the two distinct features.

Optionally, as metadata of the image data is generated by each of the primary and secondary machine learning models, S255 may function to store and index the image metadata in a (searchable image) database that may be queried to retrieve one or more image frames of the image data in response to queries. Preferably, S255 may function to store and index the image metadata in real-time and/or in parallel as the image data processing steps (e.g., S220-S250) of the method 200 are performed.

In a preferred embodiment, the metadata database may be searched using natural language queries and/or formal queries. In the case that a natural language query is received as input, a system implementing the method 200 may function to convert the natural language query into a formal query comprehensible by the system and that can be used to perform a search.

Preferably, a query to the image metadata database may function to return historical (image) data, live or real-time (image) data, and in some embodiments, return future data streams by generating alerts based on the query so that when future image data matches the query, a system implementing the method 200 may function to return the matching data.

S260, which includes generating a natural (or formal) language description of a scene, functions to use the feature output data identified by each of the disparate sub-models together with the derived relationship data, as input data, into a trained language model that functions to generate one or more stories and/or descriptions about one or more detected objects within a scene and/or one or more activities occurring in a scene.

Additionally, S260 may function to augment the descriptions and/or stories to the image data, which may include augmenting classification labels to corresponding objects and/or features within the image data and providing the descriptions and/or stories proximate to each associated activity and/or associated object within the image data, as shown by way of example in FIG. 5. Accordingly, the image data augmented with the descriptions and/or stories may be displayed on a display or otherwise, output to a user interface system (e.g., security monitors, etc.).

Additionally, or alternatively, the trained language model used in generating the natural language descriptions and/or stories may function to implement a feature output prioritization scheme or algorithm that enables priority ranking of each of the feature outputs from the plurality of sub-models that enables the trained language model to develop and/or generate descriptions and/or stories about a scene with a focus of the generated description and/or story for the scene being the feature outputs having a higher priority. For example, in a scene with a non-person object, such as a tree, a person object, and a kite, a feature output prioritization algorithm may prioritize the person, the kite, and the tree, in this order; such that, the language model generates a story for the scene focusing mainly on the person, secondarily the kite, and thirdly the tree. An example story generated by the language model may be: a person is outside, the person is flying a kite, and the person is flying the kite away from the tree. In each of these example stories and/or descriptions of the scene, the person is mentioned indicating the person as the main subject.

The trained language model is preferably implemented as a recurrent neural network that allows for sequence type inputs and outputs. It shall be noted that the trained language model may be implemented by any suitable machine learning model including one or more of the machine learning models and systems described herein.

Additionally, or optionally, S265, which includes generating image data-based intelligence, may function to use the feature output data identified by each of the disparate sub-models together with the derived relationship data, as input data, into an intelligence model and/or an intelligence generator to generate one or more alerts (e.g., security alerts, emergency alerts, threat alerts, maintenance alerts, and/or the like) to one or more user interface systems and/or devices. Additionally, or alternatively, S265 may trigger one or more event handling or security/emergency/threat event mitigation protocols for handling an alert generated based on the image data intelligence. In some embodiments, one or more predetermined event mitigation protocols may be automatically triggered to address an event alert based on the generation of the image data intelligence.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor and/or the controller. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various system components and the various method processes.

As a person skilled in the art will recognize from the previous detailed description and from the figures and claims, modifications and changes can be made to the preferred embodiments of the invention without departing from the scope of this invention defined in the following claims.

What is claimed is:

1. A machine learning-based system for generating event intelligence from video image data, the system comprising:
   one or more video image data sources that capture live video image data of one or more scenes;
   a coarse feature extraction model that:
      collects input of the live video image data captured through the one or more video image data sources, the live video image data comprising a plurality of successive image frames of the one or more scenes;
      detects one or more coarse features within the live video image data by performing at least edge detection within the live video image data;
      extracts the one or more coarse features within the live video image data based on results of the edge detection;
      constructs a coarse feature mapping comprising a mapping of the one or more coarse features to each of the plurality of successive image frames of the live video image data;
   an ensemble of distinct machine learning models that:
      receives input of the coarse feature mapping at each of a plurality of distinct sub-models that define the ensemble of distinct machine learning models;
      identifies objects within the live video image data based on the coarse feature mapping;
      identifies one or more activities associated with the objects within the live video image data based on the coarse feature mapping;
      identifies one or more interactions between at least two of the objects within the live video image data based at least on the one or more activities;
   a condenser implementing a trained natural language model that:
      composes natural language descriptions based on the one or more activities associated with the objects and the one or more interactions between the objects, wherein the natural language descriptions include a plurality of interaction descriptions, wherein each interaction description identifies at least two objects and at least one interaction between the at least two objects, wherein each object identified by the interaction descriptions is one of the objects identified within the live video image data based on the coarse feature mapping;
      constructs an intelligence augmented live video image data by superimposing the natural language descriptions onto the live video image data; and
      displays via a user interface system the intelligence augmented live video image data.

2. The system according to claim 1, wherein the plurality of distinct sub-models of the ensemble of distinct machine learning models include:
   a scene-level activity recognition model,
   a scene classification model,
   a semantic scene segmentation model,
   a general object detection mode,
   a human activity model,
   a human-centric model that estimates one or more a body pose, face detection, and human attribute recognition, and
   a human-object interaction model.

3. The system according to claim 2, wherein:
   if a human is recognized by the ensemble of distinct machine learning models, a first subset of the plurality of distinct sub-models of the ensemble is activated, and
   the first subset comprises the human activity model, the human-centric model, and the human-object interaction model.

4. The system according to claim 2, wherein:
   if a human is not recognized by the ensemble of distinct machine learning models, a first subset of the plurality of distinct sub-models of the ensemble is deactivated or maintained in an inactive state, and
   the first subset comprises one or more of the human activity model, the human-centric model, and the human-object interaction model.

5. The system according to claim 1, wherein
receiving input of the feature mapping at each of the plurality of distinct sub-models includes:
   receiving the plurality of image frames associated with the feature mapping at two or more subsets of the plurality of distinct sub-models at variable image frame rates.

6. The system according to claim 1, wherein
receiving input of the feature mapping at each of the plurality of distinct sub-models includes:
   receiving the plurality of image frames associated with the feature mapping at a first subset of the plurality of distinct sub-models at a first predetermined image frame rate,
   receiving the plurality of image frames associated with the feature mapping at a second subset of the plurality of distinct sub-models at a second predetermined image frame rate, and
   the first subset is distinct from the second subset.

7. The system according to claim 1, further comprising:
a mutual feature data exploration engine that:
   collects feature output data generated by each of the plurality of distinct sub-models of the ensemble, wherein the feature output data includes extracted features from the video image data output from each of the plurality of distinct sub-models;
   identifies and extracts mutuality data and/or relationship data between one or more pairs of extracted features, wherein each of the one or more pairs comprises a first distinct extracted feature from one of the plurality of distinct sub-models and a second distinct extracted feature from another of the plurality of distinct sub-models; and
   generates one or more mutuality vectors or one or more relationship vectors based on the extracted mutuality data and/or relationship data between each of the one or more pairs of extracted features.

8. The system according to claim 7, wherein
the condenser implementing the trained natural language model further:
   receives an input of the one or more mutuality vectors or the one or more relationship vectors generated by the mutual feature data exploration engine; and
   composes the natural language descriptions based on the input of the one or more mutuality vectors or the one or more relationship vectors.

9. The system according to claim 7, wherein
the mutual feature data exploration engine identifies and extracts mutuality data and/or relationship data between one or more pairs of extracted features by:
  constructing a plurality of vector pairwise between extracted features of at least two distinct sub-models of the plurality of distinct sub-models;
  identifying overlapping segments or intersecting segments between the extracted features of each of the plurality of vector pairwise; and
  if an overlapping segment or an intersecting segment is identified between the extracted features of one or more of the plurality of vector pairwise, responsively generating the one or more mutuality vectors or the one or more relationship vectors.

10. The system according to claim 7, wherein
the mutual feature data exploration engine identifies and extracts mutuality data and/or relationship data between one or more pairs of extracted features by:
  constructing a plurality of vector pairwise between extracted features of at least two distinct sub-models of the plurality of distinct sub-models that are in pixel proximity within the video image data; and
  if pixels of a first distinct extracted feature is within a predetermined distance threshold of pixels of a second distinct extracted feature of one or more of the plurality of vector pairwise, responsively generating the one or more mutuality vectors or the one or more relationship vectors.

11. The system according to claim 1, wherein
the machine learning-based system:
  stores and indexes in a searchable video image database image metadata associated with the video image data produced by each of the coarse feature extraction model and the ensemble of distinct machine learning models.

12. The system according to claim 11, wherein
the machine learning-based system:
  receives a search query at the searchable video image database; and
  returns one or more of historical video image data and live video image data from the one or more video image data sources based on the search query.

13. The system according to claim 7, wherein
the machine learning-based system:
  generates video image data-based intelligence based on outputs of one or more of the plurality of distinct sub-models of the ensemble and the mutual feature data exploration engine; and
  generates a security alert to one or more user interface systems based on the video image data-based intelligence.

14. The system according to claim 1, wherein:
the one or more video image data sources comprise one or more video cameras, and
the live video image data comprises video image data.

15. The system according to claim 1, wherein:
one or more components and/or processes of the machine learning-based system are implemented via an on-premise device distinct from the one or more video image data sources, the on-premise device being located near or proximate to the one or more video image data sources, and
one or more other components and/or processes of the machine learning-based are implemented via a remote distributed computing network.

16. A method for implementing a machine learning-based system for generating event intelligence from video image data, the method comprising:
  implementing a coarse feature extraction model that:
    collects input of the live video image data captured through one or more video image data sources, the live video image data comprising a plurality of successive image frames of the one or more scenes;
    detects one or more coarse features within the live video image data by performing at least edge detection within the live video image data;
    extracts the one or more coarse features within the live video image data based on results of the edge detection;
    constructs a coarse feature mapping comprising a mapping of the one or more coarse features to each of the plurality of successive image frames of the live video image data;
  implementing an ensemble of distinct machine learning models that:
    receive input of the coarse feature mapping at each of a plurality of distinct sub-models that define the ensemble of distinct machine learning models;
    identify objects within the live video image data based on the coarse feature mapping;
    identify one or more activities associated with the objects within the live video image data based on the coarse feature mapping;
    identify one or more interactions between at least two of the objects within the live video image data based at least on the one or more activities;
  implementing a condenser associated with a trained natural language model that:
    composes natural language descriptions based on the one or more activities associated with the objects and the one or more interactions between the objects, wherein the natural language descriptions include a plurality of interaction descriptions, wherein each interaction description identifies at least two objects and at least one interaction between the at least two objects, wherein each object identified by the interaction descriptions is one of the objects identified within the live video image data based on the coarse feature mapping;
    constructs an intelligence augmented live video image data by superimposing the natural language descriptions onto the live video image data; and
    displays via a user interface system the intelligence augmented live video image data.

17. The method according to claim 16, further comprising:
  implementing a mutual feature data exploration engine that:
    collects feature output data generated by each of the plurality of distinct sub-models of the ensemble, wherein the feature output data includes extracted features from the video image data output from each of the plurality of distinct sub-models;
    identifies and extracts mutuality data and/or relationship data between one or more pairs of extracted features, wherein each of the one or more pairs comprises a first distinct extracted feature from one of the plurality of distinct sub-models and a second distinct extracted feature from another of the plurality of distinct sub-models; and
    generates one or more mutuality vectors or one or more relationship vectors based on the extracted mutuality data and/or relationship data between each of the one or more pairs of extracted features.

18. The method according to claim 17, wherein implementing the condenser further includes:
receiving an input of the one or more mutuality vectors or the one or more relationship vectors generated by the mutual feature data exploration engine; and
composing the natural language descriptions based on the input of the one or more mutuality vectors or the one or more relationship vectors.

19. The method according to claim 16,
wherein identifying one or more activities comprises: simultaneously identifying in real-time a plurality of activities including at least a first activity and a second activity,
wherein identifying one or more interactions comprises simultaneously identifying in real-time a plurality of interactions including at least a first interaction between at least two of the identified objects based on the first activity, and a second interaction between at least two of the identified objects based on the second activity,
wherein composing natural language descriptions comprises: simultaneously composing in real-time a plurality of interaction descriptions including at least a first interaction description that describes the first interaction, and a second interaction description that describes the second interaction, and
wherein superimposing the natural language descriptions comprises: simultaneously superimposing in real-time the plurality of interaction descriptions, including the first interaction description and the interaction second description, onto the live video image data.

20. The method according to claim 19,
wherein constructing a coarse feature mapping comprises: determining a set of numerical data for each of the extracted coarse features and associating each set of numerical data with pixels in the live video image data,
wherein the coarse feature mapping identifies the extracted coarse features and pixels in the live video image data associated with each of the extracted coarse features,
wherein at least a first model and a second model receive the numerical data for the extracted coarse features as input,
wherein the first model processes the input numerical data to identify the objects, and
wherein the second model processes the input numerical data to identify the activities.

* * * * *